US009751388B2

(12) United States Patent
Roth

(10) Patent No.: US 9,751,388 B2
(45) Date of Patent: Sep. 5, 2017

(54) REMOVABLE COVER SYSTEM

(71) Applicant: CRESTING WAVE LLC, Ship Bottom, NJ (US)

(72) Inventor: John Roth, Hollis, ME (US)

(73) Assignee: CRESTING WAVE, LLC, Ship Bottom, NJ (US)

( * ) Notice: Subject to any disclaimer, the term of this patent is extended or adjusted under 35 U.S.C. 154(b) by 0 days.

(21) Appl. No.: 14/706,433

(22) Filed: May 7, 2015

(65) Prior Publication Data

US 2015/0321542 A1 Nov. 12, 2015

Related U.S. Application Data

(60) Provisional application No. 61/991,845, filed on May 12, 2014.

(51) Int. Cl.
| | | |
|---|---|---|
| *B60J 7/10* | (2006.01) | |
| *B60J 3/00* | (2006.01) | |
| *B60J 1/20* | (2006.01) | |
| *B60J 7/185* | (2006.01) | |

(52) U.S. Cl.
CPC .............. *B60J 7/102* (2013.01); *B60J 1/20* (2013.01); *B60J 3/00* (2013.01); *B60J 7/10* (2013.01); *B60J 7/185* (2013.01); *B60J 7/1851* (2013.01); *B60J 7/1856* (2013.01)

(58) Field of Classification Search
CPC ... B60J 7/102; B60J 7/10; B60J 7/1856; B60J 7/1851; B60J 7/185; B60J 7/11; B60J 7/12; B60J 1/20; B60J 3/00; E04H 15/06

USPC ............................ 160/351; 135/88.01, 88.09
See application file for complete search history.

(56) References Cited

U.S. PATENT DOCUMENTS

| | | |
|---|---|---|
| D42,330 S | 3/1912 | Link |
| D42,331 S | 3/1912 | Link |
| D147,001 S | 6/1947 | Wormer, III |
| 2,638,378 A | 5/1953 | Molinaro |
| 2,821,204 A * | 1/1958 | Hartshorn, Sr. ........ B63B 17/02 114/361 |
| 3,603,636 A | 9/1971 | Carella |
| 4,121,870 A | 10/1978 | Oakey |
| 4,174,134 A | 11/1979 | Mathis |
| D258,427 S | 3/1981 | Geraigery et al. |
| D259,340 S | 5/1981 | Stengel |
| 4,778,214 A * | 10/1988 | Fu ............................ B62J 17/08 135/88.01 |
| 4,817,999 A * | 4/1989 | Drew ..................... B60J 7/1851 292/113 |
| 4,971,370 A * | 11/1990 | Detweiler ............... E05B 81/14 292/45 |

(Continued)

*Primary Examiner* — Blair M Johnson
(74) *Attorney, Agent, or Firm* — Andrew F. Young, Esq.; Lackenbach Siegel, LLP

(57) ABSTRACT

A removable cover system may include a first cover member and a second cover member joined by an adjustable pivot system that is adjustable to accommodate different seat/ headrest and windshield positions across a diverse spectrum of car designs and models. A removable connection may secure the cover system to an automobile windshield and a seat back or headrest member. During use, the cover system provides a convenient shield from sun radiation and post use may be conveniently stored without rendering a permanent change to the automobile. The cover members of the system may be opaque, translucent, and/or transparent.

13 Claims, 2 Drawing Sheets

(56) References Cited

U.S. PATENT DOCUMENTS

| | | | | |
|---|---|---|---|---|
| 4,979,384 A | * | 12/1990 | Malesko | E05B 81/14 292/201 |
| 5,009,465 A | | 4/1991 | Induni | |
| 5,102,183 A | | 4/1992 | Swatz | |
| 5,267,774 A | | 12/1993 | Garner et al. | |
| 5,299,850 A | * | 4/1994 | Kaneko | B60J 7/1291 296/107.13 |
| 5,579,797 A | * | 12/1996 | Rogers | A45B 11/00 135/88.01 |
| 5,842,732 A | * | 12/1998 | Daggett | B60J 7/1657 135/88.01 |
| 5,975,614 A | * | 11/1999 | Mc Grue | B62J 17/08 296/102 |
| 6,247,732 B1 | * | 6/2001 | Alton | E05B 83/16 292/216 |
| 6,357,461 B1 | * | 3/2002 | Chai | B60J 1/2011 135/117 |
| 6,364,379 B1 | * | 4/2002 | Roberts | E05B 83/16 292/216 |
| D488,767 S | | 4/2004 | Ebert et al. | |
| 7,121,619 B2 | | 10/2006 | Henderson et al. | |
| 7,677,634 B2 | * | 3/2010 | Flynn | B60J 7/1226 296/107.09 |
| 7,909,394 B2 | | 3/2011 | Lewis et al. | |
| 8,011,711 B2 | | 9/2011 | Hirayama et al. | |
| 8,960,212 B2 | * | 2/2015 | Majer | B60J 11/00 135/88.07 |
| 2004/0155479 A1 | * | 8/2004 | Willard | B60J 1/1815 296/107.01 |
| 2005/0183760 A1 | * | 8/2005 | Milner | A01D 34/81 135/88.09 |
| 2009/0160224 A1 | | 6/2009 | Loetter et al. | |
| 2010/0026038 A1 | | 2/2010 | Froschle | |
| 2015/0321542 A1 | * | 11/2015 | Roth | B60J 7/10 160/351 |

* cited by examiner

REMOVABLE COVER SYSTEM

CROSS REFERENCE TO RELATED APPLICATIONS

This application claims priority to U.S. Provisional Patent Application No. 61/991,845 filed May 12, 2014, which is hereby incorporated by reference in its entirety.

FIGURE SELECTED FOR PUBLICATION

FIG. 1

BACKGROUND

Technical Field

The present disclosure relates to removable and adjustable cover system for an automobile. More particularly, the present disclosure provides a removable and adjustable cover system for an automobile that is readily removable between uses for convenient storage while providing secure protection to a user and adjustability to fit differently configured vehicles.

Description of the Related Art

Current industrial applications of removable car covers are substantially inconvenient, expensive, and require custom adjustment to a particular make or model of automobile that is irreversible.

The most common types of removable cover systems for automobiles include the 'convertible' systems that are fixably mounted to a particular vehicle, directly linked with a power supply, and particularly upholstered as a permanent addition to the automobile. Necessarily, such convertible systems require a custom mounting bracket adjusted to mate between each system and the particular vehicle windshield. Unfortunately, such systems require substantial investments in terms of costs and material, and if damaged are very difficult to repair. Also necessarily, such systems cannot be transferred between vehicles. Further detriments to such systems are obvious, in that they are nearly always opaque and will block driver sight-lines like any automobile roof system.

A related type system is the so-called removable hard-top which is stored remotely from the vehicle when not in use. Such hard-tops are also custom fitted to a particular automobile by make and model and are also specific to mounting systems that are fixed on each car to suit the particular hard-top. Similar to the 'convertible' covers above, similar detriments such as blocked sight-lines, opaque in nature, and expense all remain.

Accordingly, there is a need for an improved removable cover system that is readily attachable, will adjust to user-selected vehicles, and may be conveniently stored without detriment to the driver's sight lights while driving.

SUMMARY

In response, it is now recognized that there are several detriments in the related arts, at least one of which is overcome by one aspect of the proposed disclosure.

In one aspect of the present disclosure, a removable and adjustable cover system may include a first cover member and a second cover member joined by an adjustable pivot system. Connection members may allow for removable connection to an automobile windshield and a seat back or headrest member. During use, the cover system may provide a convenient shield from sun radiation and post use may be conveniently stored without rendering a permanent change to the automobile. Alternatives provide opaque, translucent, and transparent cover members, as well as telescoping systems for easy adjustment to different seat/headrest and windshield positions across a diverse spectrum of car designs and models.

The above and other aspects, features and advantages of the present disclosure will become apparent from the following description read in conjunction with the accompanying drawings, in which like reference numerals designate similar or the same elements.

DETAILED DESCRIPTION OF THE PREFERRED EMBODIMENTS

Figure 1:
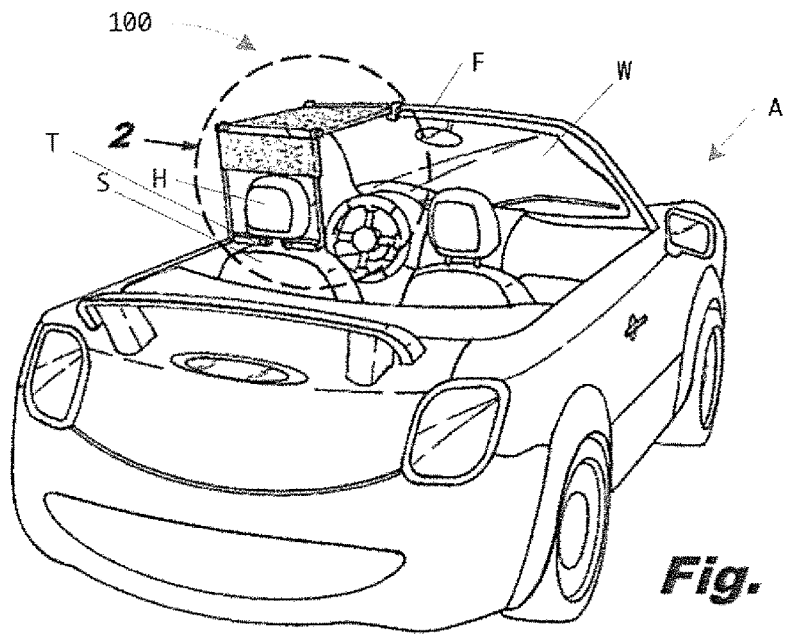
FIG. 1 is a perspective view of a removable cover system coupled to an automobile.

Reference will now be made in detail to embodiments of the present disclosure. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present disclosure, and that the detailed description is not to be taken in a limiting sense, and that elements may be differently positioned, or otherwise noted as in the appended claims without requirements of the written description being required thereto.

Figure 2:
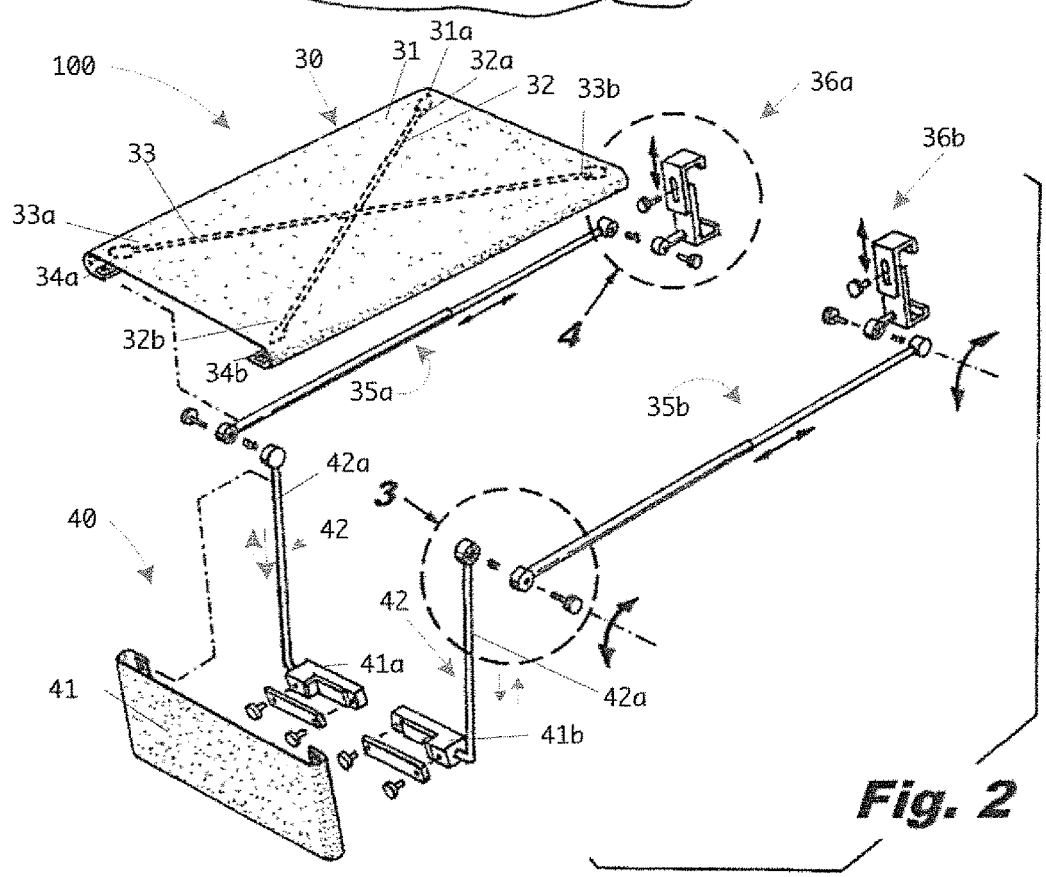
FIG. 2 is a perspective view of the indicated area of FIG. 1 including the removable cover system shown with parts separated.

In an embodiment, as shown in FIGS. 1 and 2, a removable system 100 may include a top cover section 30 at generally a top side and a rear cover section 40 generally at a rear side. Although not shown, lateral (i.e., sides) cover sections may be coupled to the top cover section 30 or the rear cover section 40 to provide lateral protection as well.

The top cover section 30 may include a material section 31, which may be formed from any suitable material. For example, the material section 31 may be found from metal, fabric or a fabric, and may be opaque or transparent. For example, the material section 31 may block light from passing through, may permit light flow, or block certain wavelengths of light (e.g, harmful wavelengths or UV light may be blocked). For example, UVA or UVB type wavelengths may be blocked by the material section 31 such that direct user-sun contact, and thus skin-burning, is discouraged. The material section 31 may be formed from a material that blocks wind or may permit airflow therethrough. For example, the material section 31 may be porous to permit airflow or may be solid to block airflow. The material section 31 may also or alternatively be formed, for example, from a woven or a non-woven material.

As shown in FIG. 1, the cover section 30 may be positioned generally parallel over the driver's or front passenger's head or generally horizontally with respect to the bottom of the seat S. The cover section 30 may also include a support structure that includes crossbars 32, 33 that may each include opposing ends 32*a*,32*b* and 33*a*,33*b*, respectively, that are secured or coupled to the material section 31 of the cover section 30. For example, the material section may be generally rectangular in shape, and may include pockets or receptacles 31*a* at or near each of its corners that are configured to receive the ends 32*a*, 32*b* of the crossbar 32 and the ends 33*a*, 33*b* of the crossbar 33. The crossbars 32, 33 may be formed from a resiliently deformable material (e.g., a metal or plastic with shape memory properties) such that the when the crossbars 32, 33 are bent, they automatically return to their initial configuration. The crossbars 32, 33 may also be formed from an opaque or a substantially translucent or transparent material. The material section 31 may include curved sections 34*a*, 34*b* that are generally opposing and may be configured to securely receive side elements 35*a*, 35*b*, which may be telescoping such that the overall length of each of the side elements 35*a*, 35*b* is adjustable. The side elements 35*a*, 35*b* and/or the crossbars 32, 33 may be removed and the material section 31 may be collapsed or folded to facilitate storage of the system 100.

Figure 4:
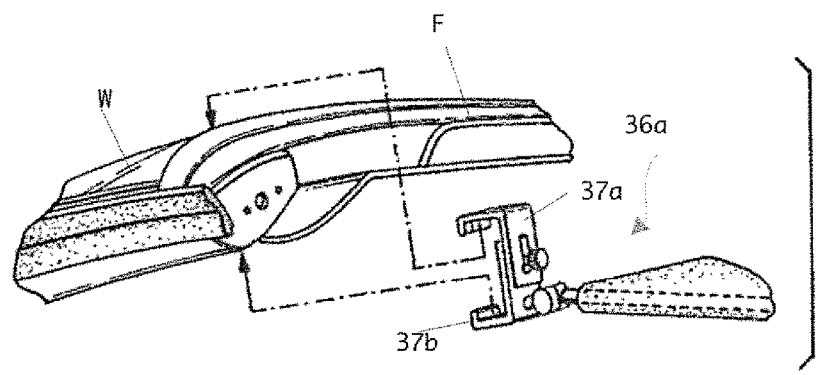
FIG. 4 is an enlarged perspective view of the indicated area of FIG. 1 shown relative to a windshield of the automobile.
Figure 5:
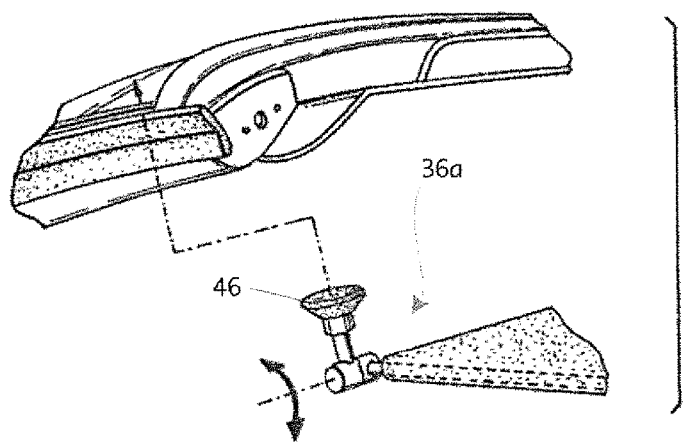
FIG. 5 is an enlarged perspective view of another embodiment of a portion of the removable cover system shown relative to a windshield of the automobile.

An adjustable clamping member 36*a*, 36*b* may be pivotably connected to one of each of the side elements 35*a*, 35*b*, and may clamp onto an outer and an inner surface of the frame F of the window W (as shown best in FIG. 4). Various alternatives to a clamping mechanism may be provided. As shown best in FIG. 5, a suction cup 46 may replace the clamp and may suction onto a surface such as an exterior surface of the windshield W (e.g., an upper exterior surface of the windshield).

Adjustable claiming systems 36*a*, 36*b* may be adaptively operative to releasably secure the top cover section 30 to a top edge of an automobile windshield member 70, as shown (FIG. 1). Each of the clamping members 36*a*, 36*b* may be adjusted to accommodate a width of the frame F of the windshield W of the automobile A, and may be secured to the frame F or to any surface within the automobile to which the clamping members 36*a*, 36*b* may be fixated (e.g., the visor). A bar (not shown) may be pivotably connected to both the ends of the side element 35*a*, 35*b* and the clamping member 36*a*, 36*b* such that the overall length of the cover section 30 may be increased if need be to accommodate the distance between the frame F and the seat S.

The rear cover section 40 may be pivotably connected to the cover section 30, and may be generally co-planar with respect to a headrest H of the seat S, and may be positioned above the headrest H or may extend to cover the back of the headrest as well. The material section 41 may include crossbars or stiffening elements 32, 33 that are secured thereto in a substantially similar manner as those of the material section 31 to maintain the material section 41 taut. Those of skill in the art will further understand that the material sections 31, 41 may be made themselves of rigid materials or integrated with stiffening elements (such as elements 32, 33) to allow for user preference and diversity. For example, such stiffening elements may be combined as a fiberglass, carbon fiber, or other panel construction within the scope and skill of the present disclosure.

The rear cover section 40 may include a material section 41 that is formed from the same or a similar material as the material section 31 of the top cover section 30. However, the material sections 31 and 41 need not be made from the same material, but may be made from contrasting materials for user enjoyment; for example, material section 41 (in the rear) may be constructed from stretchy opaque (Lycra®-type) fabric, while material section 31 (in the top) may be made from a stiffened nylon weaving that resists unintended displacement during driving while still remaining translucent to some visible light to enhance user enjoyment. Those of skill in the art will understand that alternative constructions can be made without departing from the scope and spirit of the present disclosure.

The rear cover section 40 may include adjustable clamping members 41*a*, 41*b* that are adaptively operative to secure the rear cover section 40 to a respective automobile seat back S or headrest H without leaving damage thereon in a removable manner. In particular, a headrest H may typically include a pair of tubular members T that translate generally vertically into and out from the seat back S such that the height of the headrest H relative to the seat back S is adjustable. The clamping members 41*a*, 42*b* may clamp on and be secured to these tubular members T. The adjustable clamping members 41*a*, 41*b* may include a quick release mechanism such as a lever that may be moved from a position in which the clamping members 41*a*, 41*b* are closed to another position in which the clamping members 41*a*, 41*b* can be opened.

Pivoting adjustment members 42 may include leg portions 42*a* pivotably connected to side elements 35*a*, 35*b* of the top cover section 30 an extending longitudinally therefrom and secure to the clamping members 41*a*, 42*b*. As at least one of the leg portions 42*a* and the side elements 35*a*, 35*b* may be telescoping, the proposed system 100 may be employed by users who are of smaller stature (seat close to windshield and high up off the car floor) and by users who are of large stature (seat furthest from the windshield and tilted back at a reclining angle (of up to 45% or more)), without departing from the scope and spirit of the present disclosure.

Figure 3:
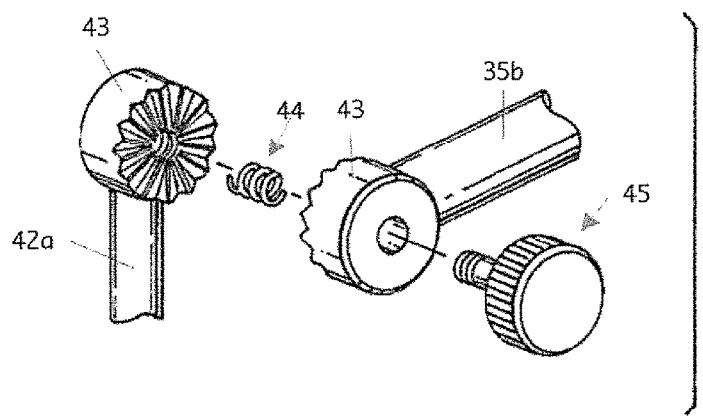
FIG. 3 is an enlarged perspective view of the indicated area of FIG. 1 shown relative to a windshield of the automobile.

As shown best in FIG. 3, the pivotable connection between the pivoting adjustment members 42 and the side elements 35*a*, 35*b* may each include two opposed and toothed disks 43 that may be interfit and secured together to provide a releasable secure pivot point for cover system 100. The position of the member 42 with respect to side element 35*a* or 35*b* may be releasably maintained via a fastening screw 45. A bar (not shown) may be pivotably connected to each of the leg sections 42*a* and to each the side elements 35*a*, 35*b* such that the overall length of the system 100 may be further increased.

Various alternatives may be provided without departing from the scope and spirit of the present disclosure. A spring member 44 may bias the opposing disks 43 toward each other such that adjustments of the positioning of the disks 43 relative one another may be controlled and incremental. Such pivotable connections may allow a user to collapse cover sections 30, 40 between uses for storage in a trunk of vehicle, and other devices and systems may be envisioned following study of the enclosed disclosure effective to allow securing during use and compact storage between uses.

Jaw members 37*a*, 37*b* of the may include spring clips, tension clip members with scissor action (not shown), magnetic secure elements, or pressure-type spring releasable members and systems or any other arrangement and configuration to achieve the same result, all within the scope and spirit of the present disclosure that maintain or bias the jaw members 37a, 37b toward a closed position. The jaw members 37a, 37b may include a quick release mechanism such as a lever that may be moved from a position in which the jaw members 37a, 37b are closed to another position in which the jaw members 37a, 37b can be opened. In one embodiment, clamping member 36a, 36b, at the end of each extending frame member, will have a C-type system with a releasable gate catch held by a spring, providing a lower-profile unit while retaining extending convenience.

It will also be understood, that as used herein the phrases 'clamping' or related actions will be understood as a functional action of securing in a releasable manner that could include naps, magnets, removable parts that first secured to a windshield or seat/headrest and are thereafter secured to a removable cover matter, all within the scope and spirit of the present disclosure.

It will be further understood, that the cover sections 30, 40 may be made in different widths and shapes within the scope of the present disclosure. In one embodiment, a preferred with of system 100 is between 16 inches wide to 20 inches wide, but narrower and wider widths may be provided without departing from the present disclosure. It is also understood that the rear cover and front cover may have different widths as well. It will be further understood that the rear cover may be constructed without a cover member and may be a support system open to the air (without blocking sunlight at all) to allow for further enhanced securement to a seat/headrest unit. Other variations will become apparent to those skilled in art in light of this disclosure.

Having described at least one of the preferred embodiments of the present disclosure with reference to the accompanying drawings, it will be apparent to those skills that the disclosure is not limited to those precise embodiments, and that various modifications and variations can be made in the presently disclosed system without departing from the scope or spirit of the disclosure. Thus, it is intended that the present disclosure cover modifications and variations of this disclosure provided they come within the scope of the appended claims and their equivalents.

What is claimed is:

1. A removable cover system for a convertible vehicle having a retractable roof including an external vehicle windshield and an external vehicle seat, a headrest and a support member coupling the seat and headrest, comprising:
    a first top cover member and a second rear cover member, the first top cover member and the second rear cover member each comprising spaced members and a covering material therebetween and being adjustably angled relative to one another;
    an adjustment system operably joining respective proximate members of said first top cover member and said second rear cover member and allowing relative adjustment therebetween along a range of angles between at least 20 degrees and 270 degrees, the adjustment system including interlocking and opposed toothed disks and a spring member biasing the opposing disks toward each other such that adjustments of the positioning of the disks relative to one another is controllable and incremental;
    a first attachment system operatively secured to a distal portion of said first top cover member opposite said adjustment system and being configured to releasably secure said first top cover member to the windshield, the first attachment system including a pivotable clamp including pair of opposable jaws configured to securely receive a portion of the windshield; and
    a second attachment system operatively secured to a distal portion of said second rear cover member opposite said adjustment system and being configured to releasably secure said second rear cover member to the seat, the second attachment system including a pivotable clamp including pair of opposable jaws configured to receive the support member.

2. The removable cover system of claim 1, further comprising:
    an length adjustment system including at least one telescopic member coupled to at least one of said first top cover member and said second rear cover member, wherein said length adjustment system enables an adjustment of an operative length of one of said respective cover members, and wherein said length adjustment system is operative to accommodate different relative positions of said external vehicle windshield and said external vehicle seat.

3. The removable cover system of claim 1, further comprising:
    wherein the adjustment system enables adjustment of said first and second attachment systems to accommodate different relative positioning of said external vehicle windshield and said external vehicle seat.

4. The removable cover system of claim 3, wherein the adjustment system releasably fixes said first top cover member and said second rear cover member relative to each other during a use thereof.

5. The removable cover system of claim 1, wherein the first top cover member and the second rear cover member are each collapsible to occupy a smaller space to facilitate storage.

6. The removable cover system of claim 1, wherein the first top cover member is formed of a material that blocks harmful wavelengths of light.

7. The removable cover system of claim 1, wherein the second rear cover member is formed of a material that blocks harmful wavelengths of light.

8. The removable cover system of claim 1, further comprising crossbars, the crossbars intersecting one another, that are releasably coupled to at least one of the first top cover member and the second rear cover member.

9. A kit for a removable cover for a convertible vehicle having a retractable roof including a windshield, a seat, and a headrest, the headrest being coupled to the seat by a headrest support member, comprising:
    a top cover section releasably securable to the windshield;
    the top cover section comprising opposing, telescopic side elements and a covering material attached therebetween;
    a rear cover section that is pivotably connected to the top cover section by an adjustment system, the rear cover section being configured to be secured to the headrest support member, the top cover section being adjustably angled relative to the rear cover section by the adjustment system;
    the rear covering section comprising opposing, telescopic leg portions and a covering material attached therebetween, the leg portions being releasably attachable to respective ones of the side elements to pivotably connect the top cover section and the rear cover section; and
    at least one attachment member, each including a clamp pivotably connected to a respective one of each of the leg portions and side elements, the clamps of the side elements being securable to the windshield and the clamps of the leg portions being securable to the headrest support portions;

the adjustment system including opposing and interlocking toothed disks pivotably connecting the side and leg members to one another and a spring member for controlled and incremental angular adjustments of the side and leg members with respect to one another.

10. The kit of claim 9, wherein one or more longitudinally extending bar members that are pivotably connectable between the clamp members and the side elements.

11. The kit of claim 9, wherein the covering material includes at least one of an opaque and a transparent material.

12. The kit of claim 9, wherein the covering material blocks harmful wavelengths of light while permitting light to pass therethrough.

13. The kit of claim 9, further comprising intersecting crossbars that are releasably coupled to at least one of the top cover section and the rear cover section.

* * * * *